(No Model.) 2 Sheets—Sheet 1.
E. WESTON.
ELECTRO MAGNETIC MOTOR.
No. 316,093. Patented Apr. 21, 1885.
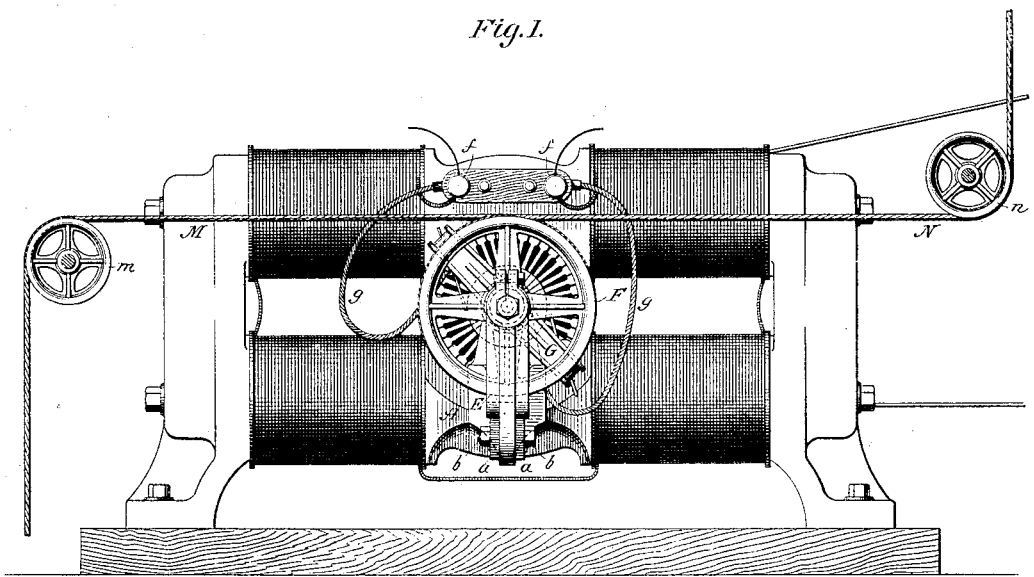
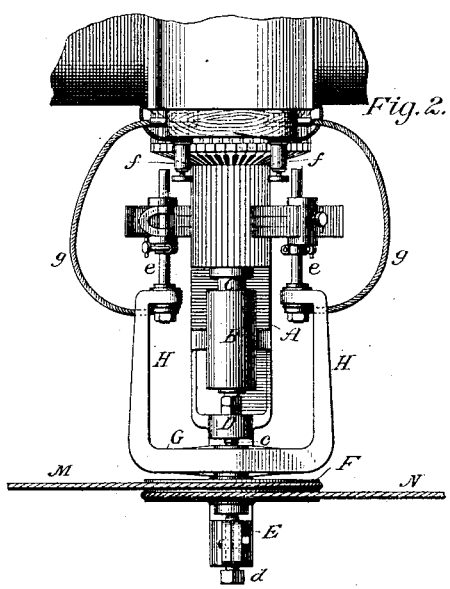
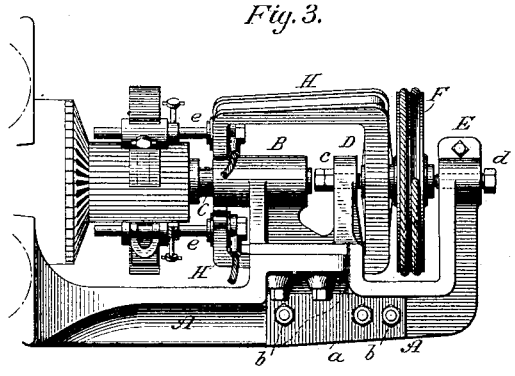
Attest:
Raymond F. Barnes
W. Frisby
Inventor:
Edward Weston
By Parker W. Page
atty.

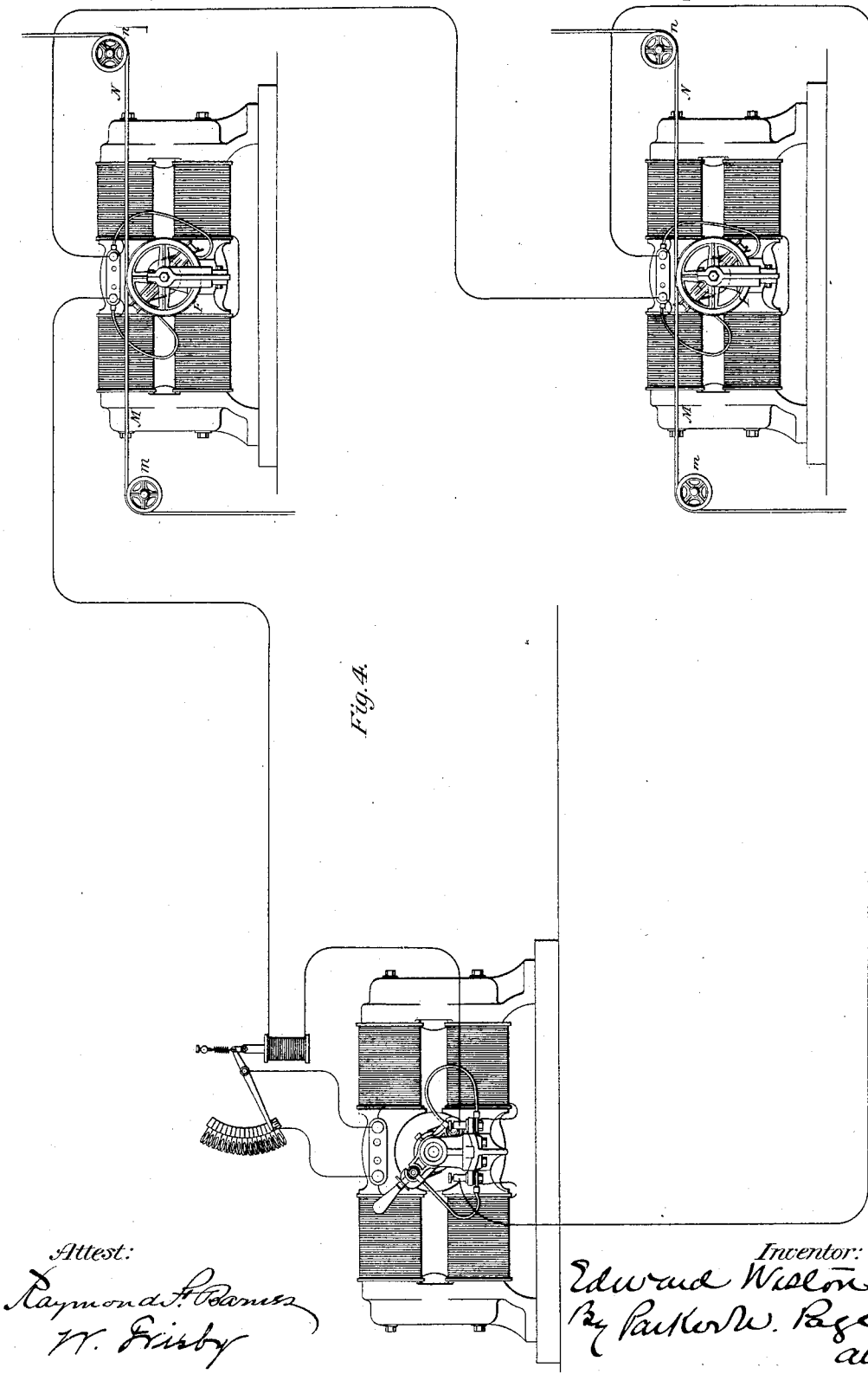

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRO-MAGNETIC MOTOR.

SPECIFICATION forming part of Letters Patent No. 316,093, dated April 21, 1885.

Application filed July 3, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electro-Magnetic Motors, of which the following is a specification, reference being had to the drawings accompanying and forming a part of the same.

In another application filed by me I have shown and described, in connection with a system for the electrical transmission and distribution of power in which electro-magnetic motors are included in series in a circuit from one or more generators, a method of regulation, the objects of which are to maintain a uniform flow of current in the working-circuit and to provide means for the independent regulation of each motor, by which its speed is kept practically uniform, while the power developed and the electrical energy consumed by the motor are varied to correspond with the load upon it. In explanation of the principles of this system, as far as is necessary to a clear understanding of the present invention, it may be stated, if two or more motors are connected in series in a circuit from a generator, each motor develops a counter electromotive force acting in opposition to the flow of the current, and the aggregate counter electro-motive force remains constant so long as there is no variation in speed or adjustment of any of the motors. If, however, the speed of any motor be retarded by increasing its load, or accelerated by diminishing its load, without changing its adjustment, the variation in its counter electro-motive force increases or diminishes, according to the nature of such variation, the strength of the current flowing.

When motors are used under the conditions ordinarily encountered in practice, the work or load of each motor is apt to vary considerably from time to time, and when the motors are connected in series such variations of load not only vary the speed of the individual motor, but, by reacting on the strength of current throughout the entire circuit, disturb the operation of the other motors.

To compensate for the variations of load and to prevent them from reacting upon or sensibly affecting the speed or action of any of the other motors, whatever may be the direction or extent of the variation, I employ with each motor a device for varying in proportion to variations in the load the effect of the magnetic forces that operate to produce the rotation of the armature, and I use with the generator a current-regulator for maintaining approximately uniform strength of current in the working-circuit. This not only maintains uniform speed in each motor, but, by reacting upon the counter electro-motive force developed by it, varies the consumption of electrical energy in accordance with the work to be performed, and prevents variations in any one motor from affecting the current supplied to other motors in the same circuit.

As the means for varying the effect of the magnetic forces that operate to produce the rotation of the armature of the motor, I have employed a device for shifting the position of the brushes upon the commutator, and thereby varying the relation of the armature to the field, it being understood that a change in the position of the commutator-brushes of a motor results in a change in the counter electro-motive force produced by the motor, the fall in counter electro-motive force being greater as the distance from the maximum points of the commutator to which the brushes are shifted is increased. It is important that the shifting of the brushes, however effected, should be done with very little expenditure of power, as in many cases it is important to secure great sensitiveness of adjustment. In the machines heretofore used, however, the method of mounting the brushes or brush-holder has precluded this; and the object f my present invention is to remedy this objection and to so support or mount the brushes that they may be shifted to any desired position on the commutator with the least possible opposition.

To this end my invention consists, mainly, in mounting the brush-holders independent of the armature-shaft, using for this purpose adjustable centers, placed as hereinafter described; second, in combining with the holders means for turning the same, and also in the specific features of construction of these parts, which will be more fully described by reference to the accompanying drawings.

Figure 1 is a view in side elevation of a motor with my improvements applied thereto. Fig. 2 is a plan view of the commutator and appurtenances. Fig. 3 is a side view in elevation of the parts shown in Fig. 2. Fig. 4 is a diagram of the system, including the generator, motors, and regulating devices.

I may use any suitable form of motor, though I prefer to employ a machine constructed substantially as described in former patents granted to me, more especially in Patents Nos. 209,532, 211,311, 259,618, and 278,641.

From the lower pole-piece extends a cast-iron support, A, carrying the journal-box B for the commutator end of the armature-shaft C.

Cast in one piece with the bearing B is an extension consisting of the vertical supports D E, which for greater strength and security are braced by one or more plates, $a$, and bolts $b$.

It is not essential that the parts B, D, and E be cast together, though this plan of construction has obvious advantages, chiefly in the greater facility with which the bearings may be trued. A double pulley-wheel, F, and brush-holder connected in any proper manner are mounted in line with the axis of the armature and commutator between the arms D and E by pivot-screws $c$ $d$, both provided with lock-nuts or their equivalents.

The brush-holding device consists of a plate or bar, G, at right angles to the axis of rotation, and arms H H, extending over toward the commutator K, near which they terminate. The brushes are carried by posts $e$, set in the ends of arms H H, and insulated from the same, and flexible cables or conductors $g$ are connected to the posts $e$ and led to binding-posts $f$ $f$ on an insulating-plate on the frame of the machine. Cords M N are secured to the pulley-wheel F, and carried around the same in the grooves in opposite directions, and then over pulleys $m$ $n$ in any manner or direction that the case may require. By means of these cords the brushes are shifted from any desired point—as, for instance, at a machine driven by the motor—and this may be done by any proper means.

To the successful operation of this mechanism a regulator with the generator is essential, and in Fig. 4 I have shown a system, including the motors, with means for shifting the brushes and a generator with a regulator. This latter may be of any kind that maintains a constant current, though I prefer a system involving a rheostat in the field-circuit of the generator that is varied by an electro-magnet in the main circuit. In the system illustrated both the generator and motors are what are commonly called "shunt-wound" or "derived field-circuit" machines. The described method of mounting or supporting the brush-holders renders it an extremely easy matter to turn the brushes on the commutator. The use of very delicate and sensitive apparatus for effecting this is thus rendered practicable. Though applicable generally to any machine or motor the brushes of which are to be shifted in a similar manner, it is more particularly designed for use with motors when run in series, as herein set forth.

What I claim as my invention is—

1. The combination, with the commutator of a dynamo-electric machine or motor, of brushes bearing upon and capable of movement around the commutator, and holders therefor supported or mounted in centers at the end and in line with the axis of the armature-shaft, substantially as set forth.

2. The combination, with the armature and commutator of a dynamo-electric machine or motor, of supports or standards secured to the journal-support, a brush-holder mounted between the standards in line with the armature-shaft, brushes carried by the holder, and means for turning the holder for adjusting the position of the brushes, as set forth.

3. The combination, with the commutator of a dynamo-electric machine or motor, of the standards D E, the brush-holder and brushes L L, the double pulley-wheel F, and cords M N, all substantially as set forth.

4. The combination, with the bearing B, and cast in one piece therewith, of the standards D E, the brush-holder and brushes L L, double pulley-wheel F, and cords M N, as set forth.

5. The combination, with the bearing B, of the standards D E, the brush-holder, the pivots $c$ $d$, for centering the same, the brushes L L, and means for turning the same.

In testimony whereof I have hereunto set my hand this 26th day of June, 1884.

EDWARD WESTON.

Witnesses:
R. W. BLOEMEKE,
C. A. REILLY.